US008229630B2

(12) United States Patent
Klug et al.

(10) Patent No.: US 8,229,630 B2
(45) Date of Patent: Jul. 24, 2012

(54) ELECTRONIC AIRBAG CONTROL UNIT HAVING AN AUTONOMOUS EVENT DATA RECORDER

(75) Inventors: Thomas Klug, Augsburg (DE); Timo Dittfeld, Munich (DE); Frank Auer, Roehrmoos (DE)

(73) Assignee: Infineon Technologies AG, Neubiberg (DE)

( * ) Notice: Subject to any disclaimer, the term of this patent is extended or adjusted under 35 U.S.C. 154(b) by 1121 days.

(21) Appl. No.: 12/029,293

(22) Filed: Feb. 11, 2008

(65) Prior Publication Data

US 2009/0204295 A1 Aug. 13, 2009

(51) Int. Cl.
*B60R 16/02* (2006.01)
*B60R 99/00* (2009.01)

(52) U.S. Cl. .......................................... 701/45; 340/436

(58) Field of Classification Search .................. 280/734, 280/735; 701/35, 45; 340/425.5, 436
See application file for complete search history.

(56) References Cited

U.S. PATENT DOCUMENTS

| | | | | |
|---|---|---|---|---|
| 4,498,151 | A * | 2/1985 | Henry | 711/103 |
| 5,357,438 | A * | 10/1994 | Davidian | 701/301 |
| 6,430,488 | B1 * | 8/2002 | Goldman et al. | 701/36 |
| 6,735,506 | B2 * | 5/2004 | Breed et al. | 701/36 |
| 6,961,807 | B1 * | 11/2005 | Hauck | 711/103 |
| 6,980,092 | B2 * | 12/2005 | Turnbull et al. | 340/425.5 |
| 7,281,113 | B2 * | 10/2007 | Fujita et al. | 711/202 |
| 7,327,226 | B2 * | 2/2008 | Turnbull et al. | 340/425.5 |
| 7,772,966 | B2 * | 8/2010 | Turnbull et al. | 340/425.5 |
| 2002/0032510 | A1 * | 3/2002 | Turnbull et al. | 701/49 |
| 2005/0268069 | A1 * | 12/2005 | Fujita et al. | 711/202 |
| 2006/0097855 | A1 * | 5/2006 | Turnbull et al. | 340/425.5 |
| 2010/0005531 | A1 * | 1/2010 | Largman et al. | 726/24 |
| 2010/0194549 | A1 * | 8/2010 | Tonokawa et al. | 340/425.5 |
| 2010/0250060 | A1 * | 9/2010 | Maeda et al. | 701/35 |
| 2010/0305813 | A1 * | 12/2010 | Bury | 701/35 |

FOREIGN PATENT DOCUMENTS

| | | |
|---|---|---|
| DE | 297 05 400 U1 | 5/1997 |
| DE | 198 27 622 A1 | 12/1999 |

OTHER PUBLICATIONS

Charge Pump, (Wikipedia) Sep. 13, 2006, [online], Retrieved from the Wayback Machine Internet Archive <URL: http://replay.waybackmachine.org/20060913000000/http://en.wikipedia.org/wiki/Charge_pump>.*

Cache, (Wikipedia) Sep. 23, 2006, [online], Retrieved from the Wayback Machine Internet Archive <URL: http://replay.waybackmachine.org/20060923091736/http://en.wikipedia.org/wiki/Cache>.*

Decoupler, (Wikipedia) Sep. 13, 2006, [online], Retrieved from the Wayback Machine Internet Archive <URL: http://replay.waybackmachine.org/20060913000000/http://en.wikipedia.org/wiki/Decoupling_capacitor>.*

* cited by examiner

*Primary Examiner* — Paul N Dickson
*Assistant Examiner* — Barry Gooden, Jr.
(74) *Attorney, Agent, or Firm* — Slater & Matsil, L.L.P.

(57) ABSTRACT

Embodiments of the present invention relate generally to an electronic control unit for an airbag, said control unit having a data recorder unit that has a volatile memory, a nonvolatile memory and a copy circuit. The copy circuit is designed to copy data from the volatile memory to the nonvolatile memory during a second operating phase of the control unit. A protocol unit designed to record vehicle and/or accident data in the volatile memory is arranged in the data recorder unit during a first operating phase of the control unit. A first power supply unit is connected to the control unit and supplies the protocol unit and further components of the control unit with power and a second power supply unit is connected to the data recorder unit and supplies the latter with power.

21 Claims, 1 Drawing Sheet

ELECTRONIC AIRBAG CONTROL UNIT HAVING AN AUTONOMOUS EVENT DATA RECORDER

TECHNICAL FIELD

The invention relates to an electronic control unit for an airbag, which is often also referred to as an airbag ECU ("Airbag Electronic Control Unit"), having an autonomous event data recorder, which is often also called an EDR ("Event Data Recorder").

BACKGROUND

The practice of recording vehicle and accident data in a nonvolatile memory in the vehicle shortly before, during and after an accident is becoming increasingly important. These data are intended to assist with being able to reconstruct the accident and its cause as accurately as possible. Such systems are also of interest to insurance companies who wish to use the data to determine insurance payments in the event of damage. Furthermore, legal provisions for recording accident data have been proposed by various authorities (for example the National Highway Traffic Safety Administration) and other organizations.

Existing systems are not designed to store a relatively large quantity of data. Certain components of a vehicle, for example the airbag ECUs, must have a power supply which is independent of the vehicle's power supply in the event of the vehicle's power supply failing on account of an accident. For this purpose, an "emergency power supply" is ensured in known systems with the aid of electrolytic capacitors.

However, the operation of storing a relatively large quantity of data in a nonvolatile memory can take up a relatively large amount of time, for example two seconds. A very large number of capacitors and very large capacitors would be needed to maintain the power supply for the airbag ECUs over such a long period of time, which would make the overall system appreciably more expensive.

There is therefore a need for a new concept of an airbag ECU having a data recorder unit (a so-called "event data recorder") which manages to ensure the power supply with the smallest possible number of capacitors in the event of an accident.

SUMMARY

One example of the invention relates to an electronic control unit for an airbag, said control unit having: a data recorder unit which has a volatile memory, a nonvolatile memory and a copy circuit, the copy circuit being designed to copy data from the volatile memory to the nonvolatile memory during a second operating phase of the control unit; a protocol unit which is designed to record vehicle and/or accident data in the volatile memory arranged in the data recorder unit during a first operating phase of the control unit; a first power supply unit which is connected to the control unit and supplies the protocol unit and further components of the control unit with power; and a second power supply unit which is connected to the data recorder unit and supplies the latter with power.

BRIEF DESCRIPTION OF THE FIGURES

The following figures and the further description are intended to assist with better understanding of the invention. The elements in the figures should not necessarily be understood as a restriction, rather importance is placed on illustrating the principle of the invention. In the figures, the same reference symbols denote corresponding parts.

DETAILED DESCRIPTION OF THE FIGURES

The electronic control unit for airbags (airbag ECU) is the only control device in a vehicle which has to be able to maintain its functions for a particular amount of time (that is to say autonomy time $T_A$) when there is no external supply from the car battery. This is important, in particular, when the battery supply for the airbag ECU has broken down on account of a defect or else on account of the impact which is just occurring. In some cases, the battery is also deliberately disconnected from the vehicle electrical system in the event of an accident.

As already explained at the outset, it is necessary to store increasingly comprehensive data records in the event of an accident, which data records likewise have to be stored in a nonvolatile memory during the autonomy time independently of the external battery supply. The power supply during the autonomy time is usually ensured with the aid of electrolytic capacitors which are charged to a high voltage (higher than the battery voltage) in order to store as much energy as possible. During the autonomy time $T_A$, the energy stored in the capacitor is discharged to the airbag ECU again via a voltage converter and the circuit components arranged in the airbag ECU are thus supplied with power.

During the autonomy time $T_A$, the airbag ECU must perform the following functions: triggering of the airbags, logging of the vehicle and accident data to be stored (for example speed, braking acceleration, transverse acceleration, braking time, status of the lighting system and of the indicators, etc.) and storing of the logged data in a nonvolatile memory, for example an EEPROM.

The airbags are triggered during a "fire interval" $T_F$ of approximately 2 ms to 30 ms, during which the current requirement is approximately 20 A. At the same time or afterward, a so-called "protocol interval" $T_P$ begins, during which the vehicle and accident data are logged as mentioned above. In this case, the current requirement is approximately 300 mA for a protocol interval of 250 ms, for example. The maximum autonomy time $T_A$ results from the sum of the fire interval $T_F$ and the protocol interval $T_P$.

The operation of storing the logged data in a nonvolatile memory can take up a very large amount of time, for example approximately 2 seconds or else more, in the case of the required quantities of data. Storing comprehensive vehicle and accident data considerably lengthens the required autonomy time (octuples it in the present example), as a result of which it also becomes necessary to considerably increase the capacitance of the electrolytic capacitors which ensure the power supply during the autonomy time.

Figure 1:
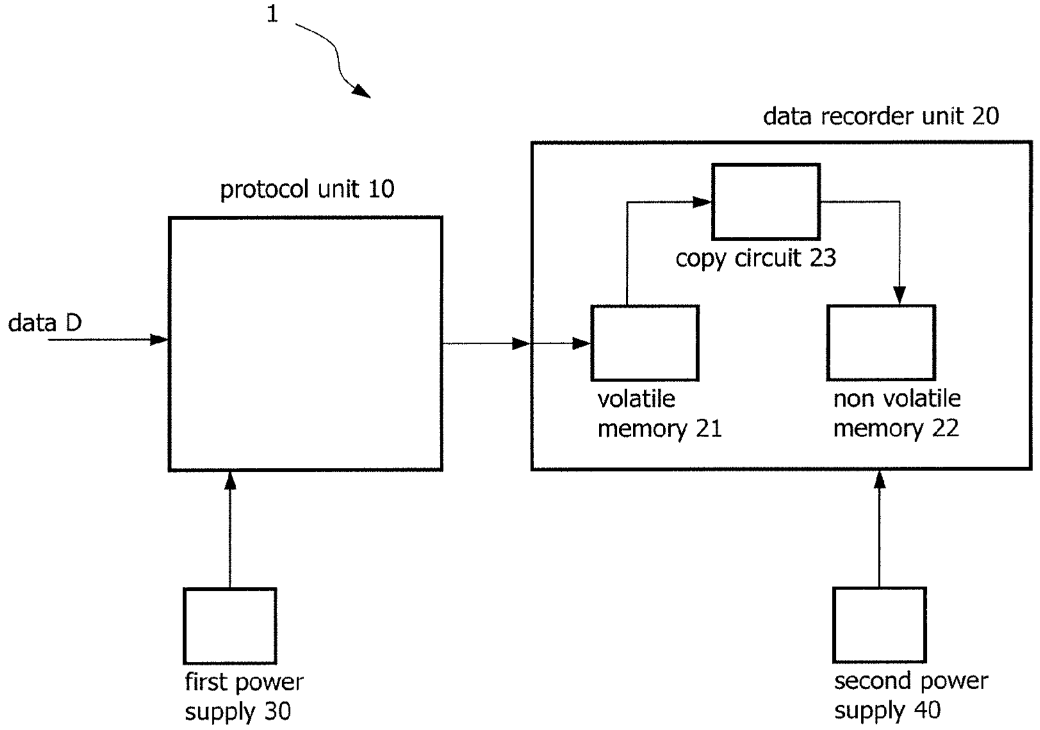
FIG. 1 shows a block diagram of one example of the circuit arrangement according to the invention.

FIG. 1 uses a first example of the invention to show a new concept of an airbag ECU, in which, despite a long autonomy time of, for example, two seconds, it is nevertheless necessary to increase the capacitance of the electrolytic capacitors only slightly, which entails a not insignificant cost advantage for the manufacturer.

The circuit arrangement comprises an electronic control unit for an airbag (airbag ECU 1) and two power supply units 30, 40. The electronic control unit 1 comprises a data recorder unit 20 which has a volatile memory 21, a nonvolatile memory 22 and a copy circuit 23. The airbag ECU has a plurality of operating phases, namely the abovementioned firing phase, the protocol phase and a recorder phase. The copy circuit 23 is designed to copy data from the volatile memory 21 to the nonvolatile memory 22 during a second operating phase (recorder phase) of the control unit 1.

The electronic airbag ECU 1 also comprises a protocol unit 10 which is designed to receive vehicle and/or accident data via an interface (for example a CAN bus interface) and store them in the volatile memory 21 of the data recorder unit 20 during a first operating phase (protocol phase) of the control unit 1. A first power supply unit 30 is connected to the control unit 1 in order to supply the protocol unit 10 and further components of the control unit 1 with power. A second power supply unit 40 is connected to the data recorder unit 20 in order to supply the latter with power, in particular when the power reserves of the first power supply unit have been used up, for example on account of damage caused by an accident, that is to say during the autonomy time $T_A$.

The volatile memory 21 is a RAM module, for example, and the nonvolatile memory 22 is an EPROM or EEPROM, for example. The second power supply unit 40 comprises a capacitor $C_{LER}$. An electrolytic capacitor whose capacitance is large enough to ensure the power supply for the data recorder unit 20 at least for the duration of the operation of copying the data from the volatile memory 21 to the nonvolatile memory 22 can be used as the capacitor, for example. This copying operation may last two seconds or more, depending on the number of data items which have to be stored. It is important to note that the second power supply unit 40 supplies only the recorder unit 20 with power during the autonomy time $T_A$, whereas all other components can be switched off, depending on the state of the first power supply unit 30. The first power supply unit 30 must ensure the power supply for the airbag ECU 1 during the fire and protocol intervals. However, it need not be designed for the entire autonomy time including the recorder interval $T_R$.

Separating the recorder unit 20 from the protocol unit 10 makes it possible to considerably reduce the power consumption of the airbag ECU 1 during the long recorder interval because only the recorder unit 20 has to be operating and all other components of the airbag ECU 1 can be switched off. The recorder unit contains only the essential circuit elements which are required for permanently storing the relevant vehicle and accident data. Consequently, a considerably smaller number of electrolytic capacitors are required to maintain the recorder function than if the data were directly stored by the protocol unit.

The protocol unit 10 comprises, for example, a microprocessor core and a data interface which is used to receive the data D to be stored. The interface may be, for example, a CAN bus interface which is used to receive all relevant vehicle and accident data. These data are, for example, the speed of the vehicle, acceleration values, braking time, etc.

Figure 2:
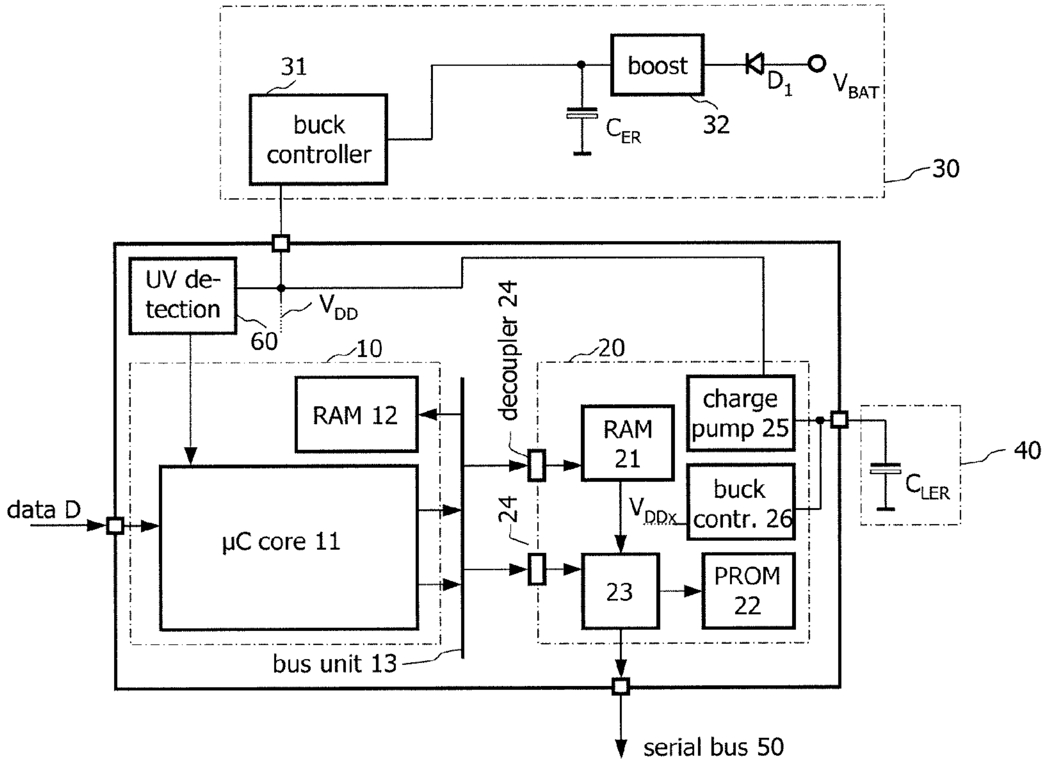
FIG. 2 shows the circuit arrangement from FIG. 1 in greater detail.

FIG. 2 shows, as another example of the invention, a more detailed embodiment of the example from FIG. 1. The first power supply unit 30 is formed by a step-down converter 31 which is connected to the car battery, a diode D1 and a step-up converter 32 (boost converter) being able to be connected between the input of the step-down converter 31 (buck converter) and the car battery. Furthermore, the voltage at the input of the step-down converter 31 is buffered by a buffer capacitor $C_{ER}$. In the event of the battery voltage $V_{BAT}$ breaking down, the diode $D_1$ prevents the buffer capacitor $C_{ER}$ from being discharged in an undesirable manner. The buffer capacitor $C_{ER}$ must still supply the entire airbag ECU for the airbag (airbag ECU) with power for a certain amount of time via the step-down converter 31. This time is approximately 250 milliseconds for firing the airbags and logging the relevant vehicle and/or accident data in a RAM. In the case of a typical current consumption of approximately 300 mA over the protocol interval $T_P$ of 250 milliseconds and a required current of 20 amps for firing the airbags over the fire interval $T_F$ of 2 milliseconds, the capacitance of the buffer capacitor $C_{ER}$ must be approximately 12 000 μF. In practice, this capacitance can be formed, for example, by a capacitance array of three parallel-connected electrolytic capacitors having a capacitance of 4700 μF. The first power supply unit 30 provides a supply voltage VDD of, for example, 5 volts for the airbag ECU at the output of the step-down converter 31.

According to the example from FIG. 2, the protocol unit 10 comprises a microprocessor core 11 and a RAM module 12 which are both connected by means of a data bus 13. In the event of an accident, the microprocessor core 11 receives the relevant vehicle and accident data D during the protocol phase via an interface, for example a CAN bus interface, and stores these data in the RAM module 12. At the end of the protocol phase, the data are copied from the RAM module 12 in the protocol unit 10 to the RAM module 21 of the data recorder unit 20. Alternatively, the received data D can also be directly stored in the RAM module 21 of the recorder unit 20.

This protocol phase is started by the microprocessor core 11 if an accident is detected by the airbag sensors (not illustrated). The operation of storing the vehicle and accident data in the RAM module 12 or the RAM module 21 may be effected in a very much faster manner than storing them in an EEPROM. A protocol phase is typically concluded within approximately 250 milliseconds. During this time, the first power supply unit 30 must ensure the voltage supply for the airbag ECU in the event of the battery voltage breaking down. After the protocol phase has been concluded, all components of the airbag ECU, in particular the protocol unit 10 having the microprocessor core 11, can be switched off. The switching-off operation can be effected, for example, using an undervoltage detection device 60. However, such a device is not absolutely necessary, depending on the application.

In addition to the components (volatile memory 21, nonvolatile memory 22, copy circuit 23) which have already been illustrated in FIG. 1, the recorder unit 20 also comprises a charge pump 25, a further step-down converter 26 and at least one decoupler 24. The charge pump 25 connects the first power supply unit 30 to the second power supply unit 40 which essentially comprises a further buffer capacitor $C_{LER}$. Outside the autonomy time $T_A$, the buffer capacitor $C_{LER}$ is charged to a voltage that is greater than the battery voltage via the charge pump 25 in order to store as much energy as possible in the capacitor. During the recorder phase of the autonomy time, the recorder unit 20 is supplied from the buffer capacitor $C_{LER}$. For this purpose, the further step-down converter 26 converts the capacitor voltage into an adequate supply voltage $V_{DDX}$ for the recorder unit 20.

The decoupler(s) 24 is/are arranged in the signal paths between the recorder unit 20 and the other components of the airbag ECU 1 in order to avoid undesirable effects from the recorder unit 20 on the protocol unit 10, for example, during the recorder phase of the autonomy time. The decouplers 24 may be designed, for example, to interrupt the signal paths between the recorder unit 20 and the protocol unit 10 if the supply voltage $V_{DD}$ of the first power supply unit 30 undershoots a particular limit value, that is to say an undervoltage is detected by the undervoltage detection device 60.

As already mentioned, the copy circuit 23 is designed to copy data from the RAM 21 to the nonvolatile memory 22 during the recorder phase of the autonomy time $T_A$. Alternatively, this nonvolatile memory 22 can also be connected to the copy circuit 23 as an external component via a serial bus 50, for example an SPI bus or an I2C bus. In this case, the external nonvolatile memory 22 is also supplied with the supply voltage $V_{DDX}$. Irrespective of this, all circuit components of the airbag ECU 1, with the exception of the electrolytic capacitors, can be integrated in a single application-specific integrated circuit (ASIC).

The invention claimed is:

1. An electronic control unit for an airbag, said control unit having:

a data recorder unit which has a volatile memory, a non-volatile memory and a copy circuit, the copy circuit being designed to copy data from the volatile memory to the nonvolatile memory during a second operating phase of the control unit;

a protocol unit which is designed to record vehicle and/or accident data in the volatile memory arranged in the data recorder unit during a first operating phase of the control unit;

a first power supply unit which is connected to the control unit and supplies the protocol unit and further components of the control unit with power; and a second power supply unit which is connected to the data recorder unit and supplies the data recorder unit with power during the second operating phase, and does not supply the protocol unit with power during the second operating phase.

2. The electronic control unit as claimed in claim 1, wherein the second power supply unit comprises a capacitor.

3. The electronic control unit as claimed in claim 2, wherein the capacitor has a capacitance that is large enough to ensure a power supply for the data recorder unit at least for a duration of a copying operation.

4. The electronic control unit as claimed in claim 2, wherein the capacitor has a capacitance that is large enough to ensure a power supply for the data recorder unit at least for a duration of two seconds.

5. The electronic control unit as claimed in claim 1, wherein the protocol unit comprises at least one volatile memory and the protocol unit is designed to store vehicle and/or accident data in the at least one volatile memory of the protocol unit during the first operating phase and then to copy said data from the volatile memory of the protocol unit to the volatile memory in the data recorder unit.

6. The electronic control unit as claimed in claim 1, wherein said control unit further comprises decoupler units which are arranged between the data recorder unit and the protocol unit.

7. The electronic control unit as claimed in claim 6, wherein the decoupler units decouple the data recorder unit from the further components of the control unit if the second power supply unit fails.

8. The electronic control unit as claimed in claim 1, wherein the nonvolatile memory is connected to the copy circuit by a serial bus connection.

9. The electronic control unit as claimed in claim 2, wherein the data recorder unit comprises a charge pump which is connected to the capacitor and provides a constant supply voltage for the memories and the copy circuit.

10. The electronic control unit as claimed in claim 1, wherein the protocol unit comprises an interface to a vehicle bus, wherein the interface can be used to receive the vehicle and/or accident data.

11. A method of recording event triggered data, the method comprising:

detecting an event;

storing event related data in a first RAM, wherein storing is performed by a first circuit coupled to a first power supply during a first phase of operation;

transferring the data from the first RAM to a non-volatile memory using a copy circuit during a second phase of operation; and supplying power to the copy circuit, and the first RAM, during the second phase of operation, supplying power comprising supplying power from a second power supply, wherein the second power supply does not supply power to the first circuit during the second phase of operation.

12. The method of claim 11, further comprising:

storing the event related data in a second RAM during the first phase of operation, wherein storing the event related in a second RAM is performed by the first circuit; and wherein storing the event related data in the first RAM comprises transferring the event related data from the first RAM to a second RAM during at an end of the first phase of operation.

13. The method of claim 11, further comprising:

detecting an undervoltage condition on the first power supply; and powering down the first circuit after the first phase of operation if the undervoltage condition is detected.

14. The method of claim 11, further comprising charging the second power supply coupled to the first RAM, the copy circuit and the non-volatile memory to a voltage greater than a voltage on the first power supply.

15. The method of claim 14, wherein charging the second power supply comprises charging a buffer capacitor in the second power supply using a charge pump.

16. The method of claim 11, further comprising decoupling the first circuit from the first RAM during the second phase of operation.

17. The method of claim 11, wherein:

detecting the event comprises detecting an automobile accident; and storing even related data comprises storing accident related data.

18. A method of recording automotive accident data, the method comprising:

charging a buffer capacitor coupled to a first RAM, a copy circuit and a non-volatile memory;

detecting an accident;

storing accident related data in a second RAM, wherein storing is performed by a controller during a first phase of operation, wherein the second RAM and the controller is powered by a power supply;

transferring the accident related data from the second RAM to the first RAM during an end of the first phase of operation;

transferring the data from the first RAM to a non-volatile memory using the copy circuit during a second phase of operation after the first phase of operation; and supplying power from the buffer capacitor to the copy circuit, the first RAM, and the non-volatile memory during the second phase of operation, wherein the buffer capacitor does not supply power to the second RAM and the controller.

19. The method of claim 18, wherein charging the buffer capacitor comprises charging the buffer capacitor from the power supply using a charge pump.

20. The method of claim 18, further comprising:

detecting an undervoltage condition on the power supply; and powering down the controller and the second RAM after the first phase of operation if the undervoltage condition is detected.

21. The method of claim 18, wherein detecting an accident comprises detecting an airbag deployment.

* * * * *